(12) United States Patent
Knapp

(10) Patent No.: US 8,674,913 B2
(45) Date of Patent: Mar. 18, 2014

(54) LED TRANSCEIVER FRONT END CIRCUITRY AND RELATED METHODS

(75) Inventor: David J. Knapp, Austin, TX (US)

(73) Assignee: Ketra, Inc., Austin, TX (US)

(*) Notice: Subject to any disclaimer, the term of this patent is extended or adjusted under 35 U.S.C. 154(b) by 663 days.

(21) Appl. No.: 12/924,628

(22) Filed: Sep. 30, 2010

(65) Prior Publication Data

US 2011/0253915 A1  Oct. 20, 2011

Related U.S. Application Data

(63) Continuation-in-part of application No. 12/806,114, filed on Aug. 5, 2010, and a continuation-in-part of application No. 12/806,117, filed on Aug. 5, 2010, and (Continued)

(51) Int. Cl.
  *G09G 3/32* (2006.01)
(52) U.S. Cl.
  USPC .................................. 345/82; 398/138
(58) Field of Classification Search
  USPC .......... 345/76, 81, 82; 250/552, 553; 398/138
  See application file for complete search history.

(56) References Cited

U.S. PATENT DOCUMENTS

| | | | |
|---|---|---|---|
| 4,029,976 A | * | 6/1977 | Fish et al. ................ 327/514 |
| 4,402,090 A | | 8/1983 | Gfeller et al. |

(Continued)

FOREIGN PATENT DOCUMENTS

| | | |
|---|---|---|
| CN | 101083866 | 12/2007 |
| CN | 101150904 | 3/2008 |

(Continued)

OTHER PUBLICATIONS

Office Action mailed May 12, 2011 for U.S. Appl. No. 12/360,467.

(Continued)

*Primary Examiner* — Tom Sheng
(74) *Attorney, Agent, or Firm* — Kevin L. Daffer; Daffer McDaniel LLP

(57) ABSTRACT

LED transceiver front end circuitry and related methods are disclosed that use an LED or LEDs to transmit light in a transmit state and to receive incident light in a receive state while helping to reduce effects of power supply noise and ripple and device leakage currents on incident light measurements in applications where such conditions exist. In the disclosed embodiments and implementations, a controlled voltage is applied across an LED or LEDs or a reference voltage is applied to an LED chain or LED to help reduce the effects of power supply noise and ripple and device leakage currents on incident light measurements during a receive state of operation. Further, with respect to the LED chain, one or more resistors are coupled in parallel to the LEDs in the LED chain.

34 Claims, 4 Drawing Sheets

Related U.S. Application Data

(63) a continuation-in-part of application No. 12/806,121, filed on Aug. 5, 2010, now Pat. No. 8,471,496, and a continuation-in-part of application No. 12/806,118, filed on Aug. 5, 2010, and a continuation-in-part of application No. 12/806,113, filed on Aug. 5, 2010, now Pat. No. 8,456,092, and a continuation-in-part of application No. 12/806,126, filed on Aug. 5, 2010, now Pat. No. 8,521,035, application No. 12/924,628, which is a continuation-in-part of application No. 12/803,805, filed on Jul. 7, 2010, and a continuation-in-part of application No. 12/360,467, filed on Jan. 27, 2009, now Pat. No. 8,179,787, and a continuation-in-part of application No. 12/584,143, filed on Sep. 1, 2009.

(60) Provisional application No. 61/277,871, filed on Sep. 30, 2009, provisional application No. 61/281,046, filed on Nov. 12, 2009, provisional application No. 61/336,242, filed on Jan. 19, 2010, provisional application No. 61/339,273, filed on Mar. 2, 2010, provisional application No. 61/273,518, filed on Aug. 5, 2009, provisional application No. 61/273,536, filed on Aug. 5, 2009, provisional application No. 61/224,904, filed on Jul. 12, 2009, provisional application No. 61/094,595, filed on Sep. 5, 2008.

(56) References Cited

U.S. PATENT DOCUMENTS

| | | | |
|---|---|---|---|
| 4,713,841 A | 12/1987 | Porter et al. | |
| 4,809,359 A | 2/1989 | Dockery | |
| 5,103,466 A | 4/1992 | Bazes | |
| 5,181,015 A | 1/1993 | Marshall et al. | |
| 5,299,046 A | 3/1994 | Spaeth et al. | 359/154 |
| 5,317,441 A * | 5/1994 | Sidman | 398/41 |
| 5,541,759 A * | 7/1996 | Neff et al. | 398/139 |
| 5,619,262 A | 4/1997 | Uno | |
| 5,657,145 A | 8/1997 | Smith | |
| 6,016,038 A | 1/2000 | Mueller et al. | 315/291 |
| 6,067,595 A | 5/2000 | Lindenstruth | |
| 6,108,114 A * | 8/2000 | Gilliland et al. | 398/195 |
| 6,150,774 A | 11/2000 | Mueller et al. | 315/291 |
| 6,234,645 B1 | 5/2001 | Börner et al. | 362/231 |
| 6,234,648 B1 | 5/2001 | Börner et al. | 362/235 |
| 6,250,774 B1 | 6/2001 | Begemann et al. | 362/231 |
| 6,384,545 B1 | 5/2002 | Lau | 315/292 |
| 6,396,815 B1 | 5/2002 | Greaves et al. | |
| 6,414,661 B1 | 7/2002 | Shen et al. | |
| 6,441,558 B1 | 8/2002 | Muthu et al. | |
| 6,498,440 B2 | 12/2002 | Stam et al. | 315/291 |
| 6,513,949 B1 | 2/2003 | Marshall et al. | 362/231 |
| 6,617,795 B2 | 9/2003 | Bruning | 315/151 |
| 6,636,003 B2 | 10/2003 | Rahm et al. | 315/179 |
| 6,639,574 B2 | 10/2003 | Scheibe | |
| 6,664,744 B2 | 12/2003 | Dietz | 315/291 |
| 6,692,136 B2 | 2/2004 | Marshall et al. | 362/231 |
| 6,788,011 B2 | 9/2004 | Mueller et al. | 315/294 |
| 6,806,659 B1 | 10/2004 | Mueller et al. | 315/295 |
| 6,831,569 B2 | 12/2004 | Wang et al. | 340/825.52 |
| 6,853,150 B2 | 2/2005 | Clauberg et al. | 315/185 |
| 6,879,263 B2 | 4/2005 | Pederson et al. | 340/815.45 |
| 6,969,954 B2 | 11/2005 | Lys | 315/155 |
| 6,975,079 B2 | 12/2005 | Lys et al. | 315/292 |
| 7,014,336 B1 | 3/2006 | Ducharme et al. | 362/231 |
| 7,038,399 B2 | 5/2006 | Lys et al. | 315/291 |
| 7,046,160 B2 | 5/2006 | Pederson et al. | 340/815.45 |
| 7,072,587 B2 | 7/2006 | Dietz et al. | 398/138 |
| 7,088,031 B2 | 8/2006 | Brantner et al. | |
| 7,135,824 B2 | 11/2006 | Lys et al. | 315/292 |
| 7,161,311 B2 | 1/2007 | Mueller et al. | 315/294 |
| 7,166,966 B2 | 1/2007 | Naugler, Jr. et al. | |
| 7,233,115 B2 | 6/2007 | Lys | 315/291 |
| 7,233,831 B2 | 6/2007 | Blackwell | 700/17 |
| 7,252,408 B2 | 8/2007 | Mazzochette et al. | 362/294 |
| 7,255,458 B2 | 8/2007 | Ashdown | 362/246 |
| 7,256,554 B2 | 8/2007 | Lys | 315/291 |
| 7,294,816 B2 | 11/2007 | Ng et al. | |
| 7,315,139 B1 | 1/2008 | Selvan et al. | |
| 7,329,998 B2 | 2/2008 | Jungwirth | |
| 7,358,706 B2 | 4/2008 | Lys | 323/222 |
| 7,359,640 B2 * | 4/2008 | Onde et al. | 398/135 |
| 7,372,859 B2 | 5/2008 | Hall et al. | 370/400 |
| 7,400,310 B2 | 7/2008 | LeMay | |
| 7,445,340 B2 | 11/2008 | Conner et al. | |
| 7,525,611 B2 | 4/2009 | Zagar et al. | |
| 7,554,514 B2 * | 6/2009 | Nozawa | 345/82 |
| 7,583,901 B2 | 9/2009 | Nakagawa et al. | |
| 7,606,451 B2 | 10/2009 | Morita | 385/24 |
| 7,607,798 B2 | 10/2009 | Panotopoulos | |
| 7,659,672 B2 | 2/2010 | Yang | |
| 7,737,936 B2 | 6/2010 | Daly | |
| 8,018,135 B2 | 9/2011 | Van De Ven et al. | |
| 8,040,299 B2 | 10/2011 | Kretz et al. | |
| 8,044,899 B2 | 10/2011 | Ng et al. | |
| 8,044,918 B2 | 10/2011 | Choi | |
| 8,159,150 B2 | 4/2012 | Ashdown et al. | |
| 2001/0020123 A1 * | 9/2001 | Diab et al. | 600/323 |
| 2002/0014643 A1 | 2/2002 | Kubo et al. | |
| 2002/0049933 A1 | 4/2002 | Nyu | |
| 2003/0122749 A1 * | 7/2003 | Booth et al. | 345/82 |
| 2004/0052076 A1 | 3/2004 | Mueller et al. | 362/293 |
| 2004/0052299 A1 | 3/2004 | Jay et al. | |
| 2004/0136682 A1 | 7/2004 | Watanabe | |
| 2004/0201793 A1 | 10/2004 | Anandan et al. | |
| 2005/0004727 A1 | 1/2005 | Remboski et al. | 701/36 |
| 2005/0030203 A1 | 2/2005 | Sharp et al. | |
| 2005/0030267 A1 | 2/2005 | Tanghe et al. | |
| 2005/0053378 A1 | 3/2005 | Stanchfield et al. | |
| 2005/0110777 A1 | 5/2005 | Geaghan et al. | 345/179 |
| 2005/0169643 A1 | 8/2005 | Franklin | |
| 2005/0200292 A1 | 9/2005 | Naugler, Jr. et al. | 315/149 |
| 2005/0242742 A1 | 11/2005 | Cheang et al. | |
| 2006/0145887 A1 | 7/2006 | McMahon | |
| 2006/0164291 A1 | 7/2006 | Gunnarsson | 342/51 |
| 2006/0220990 A1 | 10/2006 | Coushaine et al. | |
| 2006/0227085 A1 | 10/2006 | Boldt, Jr. et al. | 345/83 |
| 2007/0040512 A1 | 2/2007 | Jungwirth et al. | |
| 2007/0109239 A1 | 5/2007 | den Boer et al. | |
| 2007/0132592 A1 | 6/2007 | Stewart et al. | 340/572.8 |
| 2007/0139957 A1 | 6/2007 | Haim et al. | 362/600 |
| 2007/0248180 A1 | 10/2007 | Bowman et al. | |
| 2007/0279346 A1 | 12/2007 | den Boer et al. | |
| 2008/0107029 A1 | 5/2008 | Hall et al. | |
| 2008/0136770 A1 | 6/2008 | Peker et al. | |
| 2008/0150864 A1 | 6/2008 | Bergquist | |
| 2008/0186898 A1 | 8/2008 | Petite | |
| 2008/0222367 A1 | 9/2008 | Co | |
| 2008/0235418 A1 * | 9/2008 | Werthen et al. | 710/106 |
| 2008/0253766 A1 | 10/2008 | Yu et al. | |
| 2008/0265799 A1 | 10/2008 | Sibert | |
| 2008/0297070 A1 | 12/2008 | Kuenzler et al. | 315/308 |
| 2008/0304833 A1 | 12/2008 | Zheng | |
| 2008/0309255 A1 | 12/2008 | Myers et al. | 315/297 |
| 2009/0026978 A1 | 1/2009 | Robinson | |
| 2009/0040154 A1 | 2/2009 | Scheibe | |
| 2009/0049295 A1 | 2/2009 | Erickson et al. | |
| 2009/0171571 A1 | 7/2009 | Son et al. | |
| 2009/0196282 A1 | 8/2009 | Fellman et al. | |
| 2009/0245101 A1 | 10/2009 | Kwon et al. | |
| 2009/0284511 A1 | 11/2009 | Takasugi et al. | |
| 2010/0005533 A1 | 1/2010 | Shamir | |
| 2010/0061734 A1 | 3/2010 | Knapp | 398/128 |
| 2010/0096447 A1 | 4/2010 | Kwon et al. | |
| 2010/0134021 A1 | 6/2010 | Ayres | |
| 2010/0182294 A1 | 7/2010 | Roshan et al. | |
| 2010/0188972 A1 | 7/2010 | Knapp | 370/226 |
| 2010/0194299 A1 | 8/2010 | Ye et al. | |
| 2010/0272437 A1 | 10/2010 | Yoon et al. | |
| 2010/0327764 A1 | 12/2010 | Knapp | 315/250 |
| 2011/0031894 A1 | 2/2011 | Van De Ven | |

(56) References Cited

U.S. PATENT DOCUMENTS

| | | | |
|---|---|---|---|
| 2011/0044343 A1 | 2/2011 | Sethuram et al. | |
| 2011/0062874 A1 | 3/2011 | Knapp | 315/158 |
| 2011/0063214 A1 | 3/2011 | Knapp | 345/158 |
| 2011/0063268 A1 | 3/2011 | Knapp | 345/207 |
| 2011/0068699 A1 | 3/2011 | Knapp | 315/158 |
| 2011/0069094 A1 | 3/2011 | Knapp | 345/690 |
| 2011/0069960 A1 | 3/2011 | Knapp | 389/103 |
| 2011/0133654 A1 | 6/2011 | McKenzie et al. | |
| 2011/0148315 A1 | 6/2011 | Van Der Veen et al. | |
| 2011/0253915 A1 | 10/2011 | Knapp | |
| 2011/0299854 A1 | 12/2011 | Jonsson et al. | |
| 2011/0309754 A1 | 12/2011 | Ashdown et al. | |
| 2012/0229032 A1 | 9/2012 | Van De Ven et al. | |

FOREIGN PATENT DOCUMENTS

| | | | |
|---|---|---|---|
| CN | 101458067 | 6/2009 | |
| EP | 0196347 | 10/1986 | |
| EP | 0456462 | 11/1991 | |
| GB | 2307577 | 5/1997 | |
| JP | 06-302384 | 10/1994 | H05B 37/02 |
| JP | 08-201472 | 8/1996 | |
| JP | 11-025822 | 1/1999 | H01H 35/00 |
| JP | 2001-514432 | 9/2001 | H05B 37/02 |
| JP | 2007-266974 | 10/2007 | |
| WO | 2010/124315 | 11/2010 | |

OTHER PUBLICATIONS

International Search Report & Written Opinion for PCT/US2012/052774 mailed Feb. 4, 2013.
B. Hall et al., "*Jet Engine Control Using Ethernet with a BRAIN (Postprint)*," Postprint of the 44th AIAA/ASMA/SAE/ASEE Joint Propulsion Conference and Exhibition, Jul. 2008, See Section II.G.
A. Kebemou, "*A Partitioning-Centric Approach for the Modeling and the Methodical Design of Automotive Embedded System Architectures*," Dissertation of Technical University of Berlin, 2008, See Section 2.2.3.
D. O'Brien et al., *Visible Light Communications and Other Developments in Optical Wireless*, Wireless World Research Forum, 2006.
J. Zalewski et al., "*Safety Issues in Avionics and Automotive Databuses*," IFAC World Congress, Jul. 4, 2005.
Project IEEE P802.15 Working Group for Wireless Personal Area Networks (WPANs), "*Visible Light Communication; Tutorial*," Mar. 9, 2008.
PCT/US2010/000219, "*International Search Report*," dated Oct. 12, 2010.
PCT/US2010/002171, "*International Search Report*," dated Nov. 24, 2010.
PCT/US2010/004953, "*International Search Report*," dated Mar. 22, 2010.
PCT/US2010/001919, "*International Search Report*," dated Feb. 24, 2011.
U.S. Appl. No. 12/924,628, "*LED Transceiver Front End Circuitry and Related Methods*," filed Sep. 30, 2010.
PCT/US2009/004953, "*International Preliminary Report on Patentability and Written Opinion*," dated Mar. 8, 2011.
PCT/US2010/000219, "*Written Opinion of the International Searching Authority*," dated Oct. 12, 2010.
PCT/US2010/001919, "*Written Opinion of the International Searching Authority*," dated Feb. 24, 2011.
PCT/US2010/002171, "*Written Opinion of the International Searching Authority*," dated Nov. 24, 2010.
Notice of Allowance mailed Feb. 4, 2013 for U.S. Appl. No. 12/809,113.
Notice of Allowance mailed Feb. 25, 2013 for U.S. Appl. No. 12/806,121.
Notice of Allowance mailed May 3, 2013 for U.S. Appl. No. 12/806,126.
Final Office Action mailed Nov. 28, 2011 for U.S. Appl. No. 12/360,467.
Notice of Allowance mailed Jan. 20, 2012 for U.S. Appl. No. 12/360,467.
Office Action Mailed Feb. 1, 2012 for U.S. Appl. No. 12/584,143.
Final Office Action Mailed Sep. 12, 2012 for U.S. Appl. No. 12/584,143.
Office Action Mailed Aug. 2, 2012 for U.S. Appl. No. 12/806,114.
Office Action Mailed Oct. 2, 2012 for U.S. Appl. No. 12/806,117.
Office Action Mailed Jul. 11, 2012 for U.S. Appl. No. 12/806,121.
Final Office Action Mailed Oct. 11, 2012 for U.S. Appl. No. 12/806,121.
Office Action mailed Dec. 17, 2012 for U.S. Appl. No. 12/806,118.
Office Action mailed Oct. 9, 2012 for U.S. Appl. No. 12/806,126.
Office Action mailed Jul. 10, 2012 for U.S. Appl. No. 12/806,113.
Notice of Allowance mailed Oct. 15, 2012 for U.S. Appl. No. 12/806,113.
International Search Report & Written Opinion mailed Sep. 19, 2012 for PCT/US2012/045392.
Partial International Search Report mailed Nov. 16, 2012 for PCT/US2012/052774.
Final Office Action mailed Jun. 14, 2013 for U.S. Appl. No. 12/806,117.
Office Action mailed Jun. 27, 2013 for U.S. Appl. No. 13/178,686.
Final Office Action mailed Jul. 9, 2013 for U.S. Appl. No. 12/806,118.
International Search Report & Written Opinion, PCT/US2013/027157, May 16, 2013.
Office Action mailed Oct. 24, 2013 for U.S. Appl. No. 12/806,117.
Office Action mailed Nov. 12, 2013 for U.S. Appl. No. 13/231,077.
Office Action mailed Nov. 4, 2013 for Chinese Application No. 201080032373.7.
Office Action mailed Dec. 4, 2013 for U.S. Appl. No. 12/803,805.

\* cited by examiner ial Patent Application Ser. No. 61/273,518 filed Aug. 5, 2009 by David J. Knapp and entitled "Display and Optical Pointer Systems and Related Methods;" U.S. Provisional Patent Application Ser. No. 61/273,536 filed Aug. 5, 2009 by David J. Knapp and entitled "Display Calibration Systems and Related Methods;" U.S. Provisional Patent Application Ser. No. 61/277,871 filed Sep. 30, 2009 by David J. Knapp and entitled "LED Calibration Systems and Related Methods;" U.S. Provisional Patent Application Ser. No. 61/281,046 filed Nov. 12, 2009 by David J. Knapp and entitled "LED Calibration Systems and Related Methods;" U.S. Provisional Patent Application Ser. No. 61/336,242 filed Jan. 19, 2010 by David J. Knapp and entitled "Illumination Devices and Related Systems and Methods;" and U.S. Provisional Patent Application Ser. No. 61/339,273 filed Mar. 2, 2010 by David J. Knapp, et al., and entitled "Systems and Methods for Visible Light Communication;" each of which is hereby incorporated by reference in its entirety.

This application is also a continuation-in-part application of the following patent applications: U.S. patent application Ser. No. 12/360,467 filed Jan. 27, 2009 now U.S. Pat. No. 8,179,787 by David J. Knapp and entitled "Fault Tolerant Network Utilizing Bi-Directional Point-to-Point Communications Links Between Nodes;" and U.S. patent application Ser. No. 12/584,143, filed Sep. 1, 2009 by David J. Knapp and entitled "Optical Communication Device, Method and System;" which in turn claims priority to U.S. Provisional Patent Application Ser. No. 61/094,595 filed on Sep. 5, 2008 by David J. Knapp and entitled "Optical Communication Device, Method and System;" each of which is hereby incorporated by reference in its entirety.

TECHNICAL FIELD OF THE INVENTION

This invention relates to circuitry that operates an LED (light emitting diode) or LEDs as both light emitters and light detectors.

BACKGROUND

Lamps and displays using LEDs (light emitting diodes) for illumination are becoming increasingly popular in many different markets. LEDs provide a number of advantages over traditional light sources, such as fluorescent lamps, including low power consumption, long lifetime, and no hazardous material, and additional specific advantages for different applications. For instance, LEDs are rapidly replacing Cold Cathode Fluorescent Lamps (CCFL) as LCD backlights due to smaller form factor and wider color gamut. LEDs for general illumination provide the opportunity to adjust the color or white color temperature for different effects. LED billboards are replacing paper billboards to allow multiple advertisements to timeshare a single billboard. Further, projectors that use LEDs as the light source may become popular in mobile handsets, such as smartphones, in the near future. Likewise, organic LEDs or OLEDs, which use multi-colored LEDs directly to produce light for each display pixel, and which use arrays of organic LEDs constructed on planar substrates, may also become popular for many types of display applications.

With such diverse and large markets for LEDs as light sources, many semiconductor companies offer a wide range of LED driver products. Manufacturers include Analog Devices, Freescale, Infineon, Maxim Integrated Products, Linear Technologies, On Semiconductor, Supertex, ST Microelectronics, NXP, National Semiconductor, Texas Instruments, Toshiba, and Sharp among others. LED driver products range from arrays of current sources to drive many LEDs independently, as is required for a digital billboard, to switch mode power supplies to produce the high voltage used to drive a string of many LEDs serially connected, as is used in the backlight of a small computer with an LCD display, to sophisticated systems that include arrays of currents sources and power supplies to drive many LEDs and sensors and that include controllers to monitor temperature and light and adjust LED drive currents accordingly.

Although it is not widely known, LEDs not only produce light when current is applied, but LEDs also produce a current when exposed to light. As such, LEDs can be used to transmit light, and LEDs can be used to receive light. To transmit light, control circuitry can be used to produce high currents to drive the LEDs so that they emit light. To receive light, control circuitry can be used to detect the very small currents produced by the LEDs when light is incident on the LEDs.

Common circuitry to detect very small currents in optical detectors, such as silicon photo-diodes, often includes a trans-impedance amplifier, which when connected to the detector properly maintains a fixed voltage across the detector and generates a voltage proportional to the current induced in the detector by incident light. Such trans-impedance amplifiers specifically designed for optical detectors are available from semiconductor suppliers such as NXP, Texas Instruments, Maxim Integrated Products, and Analog Devices. However, difficulties can exist in implementing high performance optical receivers using such trans-impedance amplifiers. For example, because the currents produced by optical detectors are very small, the circuitry can be sensitive to noise coupled into the detection circuitry from the power supply.

U.S. Pat. No. 7,072,587 owned by Mitsubishi describes using an LED to transmit and receive light. In particular, the circuitry described uses a general purpose input/output (I/O) pin of a microcontroller connected to a serial combination of an LED and a resistor. As such, when emitting light, the power supply voltage to the microcontroller is applied to the LED and resistor, which results in a current through the LED that varies at least with power supply voltage and temperature, and consequently the light produced by the LED varies with the current. As described in this Mitsubishi patent, when the LED is detecting light, current induced in the LED forward biases the LED to produce a voltage that is either above or below a threshold that the microcontroller detects. The time taken to charge the LED to this threshold is measured to determine the intensity of incident light. Although relatively simple, the light detection circuitry described in this Mitsubishi patent is relatively slow and is susceptible to many sources of error. For instance, as the power supply voltage to the microcontroller varies, so does the threshold voltage. As such, little or no power supply rejection exists. Additionally, the capacitance of the LED, may vary from part to part and over temperature, which adversely affects the photo-current measurements. Further, leakage currents through the transistors in the microcontroller I/O pins, which vary exponentially with temperature, combine with the light induced current to change the LED capacitance and also adversely affect photo-current measurements.

As such, a need exists for electronic implementations that can provide high currents to emit light from an LED or LEDs and that can detect small currents to measure light incident on the same LED or LEDs while also reducing the effects of power supply noise and leakage currents.

SUMMARY OF THE INVENTION

LED transceiver front end circuitry and related methods are disclosed that use an LED or LEDs to transmit light in a transmit state and to receive incident light in a receive state while helping to reduce effects of power supply noise and ripple and device leakage currents on incident light measurements in applications where such conditions exist. In the disclosed embodiments and implementations, a controlled voltage is applied across an LED or LEDs or a reference voltage is applied to an LED chain or LED to help reduce the effects of power supply noise and ripple and device leakage currents on incident light measurements during a receive state of operation. Further, with respect to the LED chain, one or more resistors are coupled in parallel to the LEDs in the LED chain. Various embodiments and alternative implementations are disclosed, and additional variations could be implemented, as desired.

An example first embodiment as described herein preferentially includes a single LED to emit light from and detect light with such single LED; however, this first embodiment could also be used with multiple LEDS including a combination of parallel or serially connected LEDs or a combination of both serially and parallel connected LEDs, as desired. In such first embodiment, a current is forced through one or more LEDs to produce light during a transmit state of operation, and a controlled voltage, such as a substantially fixed voltage, is applied across the one or more LEDs during a receive state of operation. Also during the receive state of operation, a current induced in the one or more LEDs by incident light is detected. Various implementations for this first embodiment are also described.

An example second embodiment as described herein preferentially includes a chain of serially connected LEDs to emit light from and detect light with such LED chain; however, such second embodiment could be used with a combination of parallel or serially connected LEDs or a combination of both serially and parallel connected LEDs, as desired. In such second embodiment, one or more resistors are connected in parallel with the LEDs in the LED chain, and preferentially a resistor is connected across the anode and cathode terminals of each LED in the LED chain. A current is forced through the LED chain to produce light during a transmit state of operation, and a reference voltage is applied to the LED chain during a receive state of operation. Also during the receive state of operation, a voltage induced in the LED chain by incident light is measured. Various implementations for this second embodiment are also described.

It is noted that the first embodiment is advantageous for an apparatus including a single LED, and the second embodiment is advantageous for an apparatus including a chain of LEDs, although variations can be implemented as desired. The first embodiment, when including a single LED or a group of parallel connected LEDs, has the advantage of detecting incident light relatively quickly. The controlled voltage applied across the LED or LEDs can be fixed, and preferentially a trans-impedance amplifier can be used to produce a voltage from the induced current. Because the voltage across the LED remains relatively fixed, the relatively large capacitance of the LED or LEDs does not significantly affect the measurement speed.

The second embodiment, when including a chain of serially connected LEDs with one or more parallel connected resistors, has the advantage of being relatively immune to variations between LEDs in such LED chain and of utilizing the currents induced in each of the LEDs in the LED chain by incident light. It is noted that if the first embodiment without the parallel connected resistors is used with a chain of LEDs, the current produced by the chain of LEDs in response to incident light would be equal to the current produced by the weakest LED in the chain. For instance, if incident light were blocked from just one LED in such LED chain, even though all the other LEDs in the chain were exposed to light, the current produced at the end points of the chain could be nearly zero. The second embodiment overcomes this problem by including resistors connected in parallel to the LEDs in the LED chain. Provided both ends of such LED chain are connected to high impedances, such as is the case when connected to the two inputs of an instrumentation amplifier for instance, the current induced in each LED by incident light flows through each parallel connected resistor consequently producing a positive voltage across the anode to cathode terminals of each LED in the LED chain, which add to produce the voltage generated by the entire LED chain in response to incident light. If one LED in the LED chain for instance were completely blocked from incident light, only that one LED would not contribute to the voltage generated by the entire LED chain in response to incident light. As such the second embodiment is preferentially used in applications using chains of LEDs, although it could also be used with a single LED.

As described further below, the first and second embodiments can include power supply circuitry, current source circuitry, and switch circuitry that force a relatively fixed current through an LED or an LED chain respectively during a transmit or light emitting state. During a receive or light detecting state, one terminal of the LED or one end of the LED chain is connected to a fixed voltage such as ground, the output voltage of the power supply, or some other reference voltage. Such fixed voltage connected to the LED terminal is preferentially selected to be near the opposite end of the power supply range from the operating voltage of such terminal in the transmit state. In operation, such fixed voltage source helps to sink power supply noise, power supply ripple, and leakage currents from other devices, such as transistors and associated parasitic diodes, connected to such LED terminal.

It is further noted that in the first embodiment, described below in more detail with respect to FIGS. 1 and 2, the LED terminal that is not connected to a fixed voltage source is preferentially connected to one input of a trans-impedance amplifier, which forces the voltage on such LED terminal to be equal to a reference voltage applied to the other input of such trans-impedance amplifier. Such reference voltage input is preferentially equal to the fixed voltage connected to the other LED terminal. As such, the controlled voltage applied across the LED is substantially fixed and can be, for example, substantially zero volts. Additionally in this case, the voltage across parasitic and active devices connected to the LED terminal that is also connected to the trans-impedance amplifier is equal to such reference voltage, which if also set to or near zero volts or ground, reduces leakage currents.

Two implementation versions of the first embodiment are also shown in FIGS. 1 and 2. For the preferred implementation shown in FIG. 1, as further described below, the cathode of the LED is connected to a trans-impedance amplifier. For the other implementation shown in FIG. 2, as further described below, the anode of the LED is connected to the trans-impedance amplifier. Additionally, the preferred implementation version preferably connects the second input terminal of the trans-impedance amplifier to ground, and the other implementation version preferably connects the second input terminal of the trans-impedance amplifier to the power supply voltage (VDD). During the transmit state in both implementation versions, current flows from the power supply, through the anode to cathode terminals of the LED, and to ground. During the receive state, the preferred implementation version preferably connects the anode of the LED to ground, and the other implementation version preferably connects the cathode to the power supply voltage. As such, both implementation versions of the first embodiment force a current through the LED in the transmit state and apply a controlled voltage across the LED in the receive state. Additionally, the application of this controlled voltage helps to reduce power supply noise and ripple and device leakage currents in the receive state for implementations that tend to suffer from these conditions.

It is further noted that in the second embodiment, described below in more detail with respect to FIGS. 3 and 4, an anode of the LED in the LED chain that is not connected to another LED is considered the top of the LED chain, and the cathode of the LED in the LED chain that is not connected to another LED is considered the bottom of the LED chain. For this second embodiment, two implementation versions are shown in FIGS. 3 and 4, both of which forward both the top and the bottom of the LED chain to measurement circuitry that can include amplifiers, analog to digital converters, and/or clock and data recovery circuitry, for example, which measures the voltage induced across the LED chain by incident light during the receive state. Additionally, during the transmit state in both implementation versions, current flows from the power supply, through the LED chain from the top to the bottom, and to ground.

During the receive state in the preferred implementation version of the second embodiment shown in FIG. 3, the top of the LED chain is connected to a voltage reference referred to ground, which has a voltage close to but higher than zero volts or ground. Switches connected to the bottom of the LED chain are configured to high impedance states, which allows the voltage across the LED chain to be determined by the voltage induced across the LED chain by incident light. Because such induced voltage is relatively small, the voltage of the bottom of the LED chain will typically be slightly lower than the top of the LED chain and also close to zero volts, which can reduce leakage current through active and parasitic devices connected to the bottom of the LED chain.

During the receive state in the other implementation version of the second embodiment shown in FIG. 4, the bottom of the LED chain is connected to a voltage reference referred to the power supply voltage, which has a voltage close to but slightly lower than the power supply voltage. Switches connected to the top of the LED chain are configured to high impedance states, which allows the voltage across the LED chain to be determined by the voltage induced across the LED chain by incident light. Because such induced voltage is relatively small, the voltage of the top of the LED chain will typically be slightly higher than the bottom of the LED chain and also close to the power supply voltage, which can reduce leakage current through active and parasitic devices connected to the top of the LED chain.

In operation, therefore, the embodiments and various implementations shown and disclosed herein can both provide high currents to produce light from LEDs in a transmit state and detect very small currents to measure light incident on such LEDs in a receive state. Further, potentially adverse effects of power supply noise and ripple and device leakage currents that can potentially limit measurements of small currents induced in LEDs by incident light in some applications can also be reduced by the embodiments disclosed herein.

In one embodiment as disclosed herein, an apparatus for transmitting and receiving light includes current source circuitry coupled to an LED and configured to force a first current through the LED to produce light during a transmit state, control circuitry coupled to the LED and configured to apply a controlled voltage across the LED during a receive state, and measurement circuitry coupled to the LED and configured to measure a second current induced in the LED by incident light during the receive state. In a further embodiment, the LED can be a chain of LEDs. Further, the controlled voltage applied across the LED can be substantially zero volts. In addition, the controlled voltage applied across the LED can also be configured to reverse bias the LED. In a still further embodiment, the control circuitry can also include a trans-impedance amplifier coupled to a cathode of the LED. And this control circuitry can also further include switch circuitry configured to couple an anode of the LED to a power supply voltage in the transmit state and to couple the anode of the LED to ground in the receive state. Still further, the control circuitry can include a trans-impedance amplifier coupled to an anode of the LED. And this control circuitry can further include switch circuitry configured to couple the anode of the LED to a power supply voltage in the transmit state and not to couple the anode of the LED to the power supply voltage in the receive state, and still further the switch circuitry can be further configured to couple a cathode of the LED to the power supply voltage in the receive state.

In another embodiment as disclosed herein, an apparatus for transmitting and receiving light includes an LED chain including one or more serially connected LEDs with at least one LED in the LED chain coupled in parallel with a resistor, current source circuitry coupled to the LED chain and configured to force a first current through the LED chain to produce light during a transmit state, control circuitry coupled to the LED chain and configured to apply a reference voltage to the LED chain during a receive state, and measurement circuitry coupled to the LED chain and configured to measure a voltage induced in the LED chain by incident light during the receive state. In a further embodiment, each LED in the LED chain can be coupled in parallel with a resistor. Still further, the control circuitry can be configured to vary the reference voltage based upon a measurement of the voltage induced in the LED chain by incident light during the receive state. In addition, an anode of one of the LEDs in the LED chain and a cathode of one of the LEDs in the LED chain can be coupled to amplifier circuitry configured to amplify a voltage between the anode and the cathode. Still further, an anode of one of the LEDs in the LED chain and a cathode of one of the LEDs in the LED chain can be coupled to analog to digital converter circuitry configured to digitize the voltage between the anode and the cathode. In a still further embodiment, the control circuitry can include switch circuitry configured to couple an anode of one of the LEDs in the LED chain to a power supply voltage in the transmit state and to the reference voltage in the receive state. And this reference voltage can be within 1 volt from ground. In another embodiment, the control circuitry can include switch circuitry configured to couple a cathode of one of the LEDs in the LED chain to the reference voltage in the receive state and not to couple the cathode to the reference voltage in the transmit state. Further, this reference voltage can be within 1 volt from the power supply voltage, and an anode of one of the LEDs in the LED chain can be coupled to a power supply voltage in the transmit state.

In a further embodiment as disclosed herein, a method for transmitting and receiving light includes forcing a first current through an LED to produce light during a transmit state, applying a controlled voltage across the LED during a receive state, and measuring a second current induced in the LED by incident light during the receive state. In a further embodiment, the LED can be a chain of LEDs. Further, the applying step can include applying a controlled voltage of substantially zero volts across the LED. In addition, the applying step can further include reverse biasing the LED with the controlled voltage. In a further embodiment, the applying step utilizes a trans-impedance amplifier coupled to a cathode of the LED. And the method can further include coupling an anode of the LED to a power supply voltage in the transmit state and to ground in the receive state. In another embodiment, the applying step utilizes a trans-impedance amplifier coupled to an anode of the LED. And the method can further include coupling the anode of the LED to a power supply voltage in the transmit state and not to the power supply voltage in the receive state, and still further include coupling a cathode of the LED to the power supply voltage in the receive state.

In a still further embodiment as disclosed herein, a method for transmitting and receiving light includes forcing a first current through an LED chain to produce light during a transmit state where the LED chain includes one or more LEDs with at least one LED in the LED chain coupled in parallel with a resistor, applying a reference voltage to the LED chain during a receive state, and measuring a voltage induced in the LED chain by incident light during the receive state. In a further embodiment, each LED in the LED chain is coupled in parallel with a resistor. Further, the method can include varying the reference voltage based upon the measuring step. The method can also include amplifying a voltage between an anode of one of the LEDs in the LED chain and a cathode of one of the LEDs in the LED chain. The method can also include digitizing a voltage between an anode of one of the LEDs in the LED chain and a cathode of one of the LEDs in the LED chain. In a further embodiment, the applying step can include coupling an anode of one of the LEDs in the LED chain to a power supply voltage in the transmit state and to the reference voltage in the receive state. And this reference voltage can be within 1 volt from ground. In a still further embodiment, the applying step can include a cathode of one of the LEDs in the LED chain to the reference voltage in the receive state and not coupling the cathode to the voltage reference in the receive state. Further, this reference voltage can be within 1 volt from the power supply voltage, and the method can further include coupling an anode of one of the LEDs in the LED chain to a supply voltage in the transmit state.

DESCRIPTION OF THE DRAWINGS

Other objects and advantages of the invention will become apparent upon reading the following detailed description and upon reference to the accompanying drawings in which.

Figure 1:
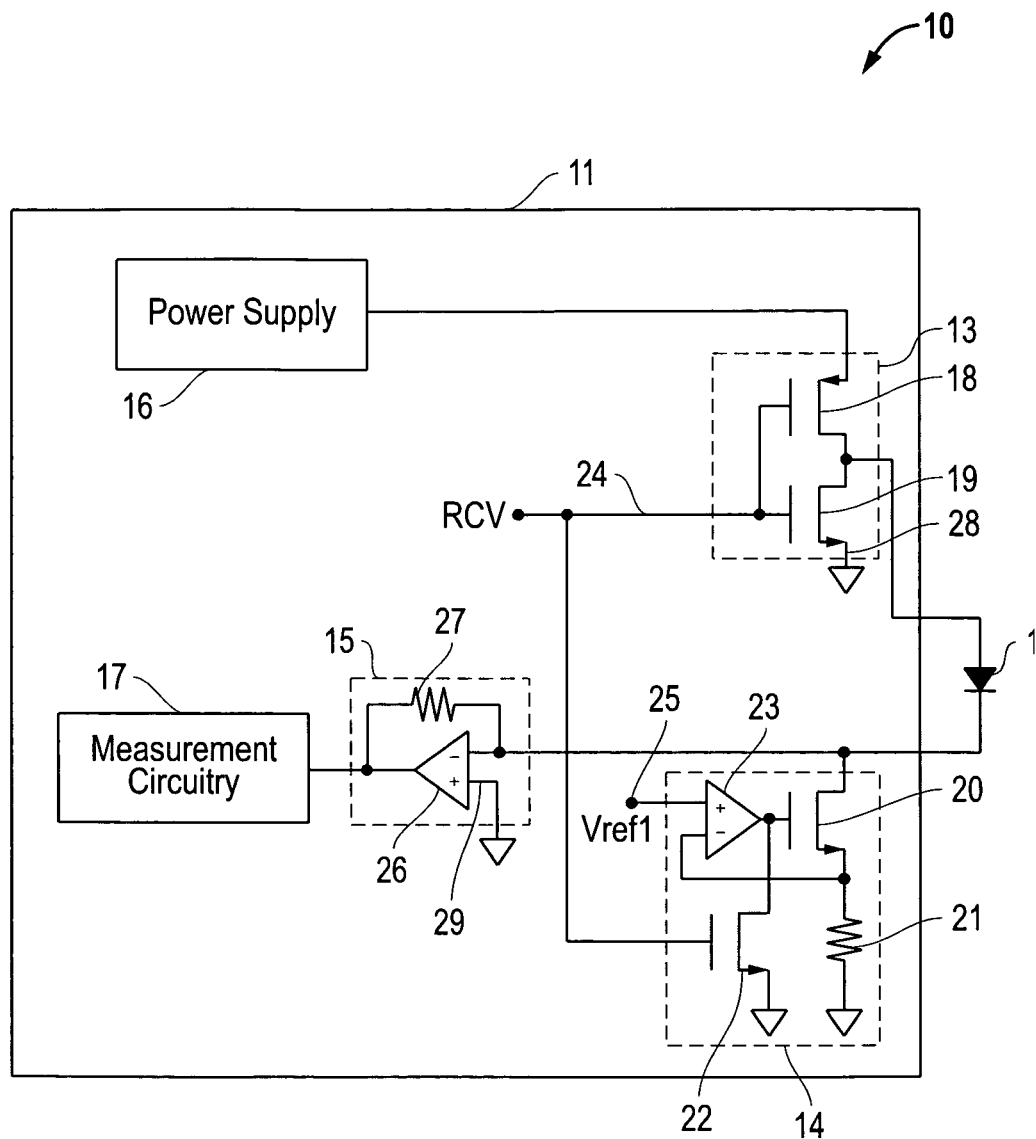
FIG. 1 is an exemplary diagram for an apparatus that both produces light from one or more LEDs and applies a controlled voltage across the one or more LEDs in order to facilitate the measurement of a current induced in the one or more LEDs by incident light.

While the embodiments are susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present embodiments.

DETAILED DESCRIPTION OF THE EMBODIMENTS

LED transceiver front end circuitry and related methods are disclosed that use an LED or LEDs to transmit light in a transmit state and to receive incident light in a receive state while helping to reduce effects of power supply noise and ripple and device leakage currents on incident light measurements in applications where such conditions exist. In the disclosed embodiments and implementations, a controlled voltage is applied across an LED or LEDs or a reference voltage is applied to an LED chain or LED to help reduce the effects of power supply noise and ripple and device leakage currents on incident light measurements during a receive state of operation. Various embodiments and alternative implementations are disclosed, and additional variations could be implemented, as desired.

Figure 2:
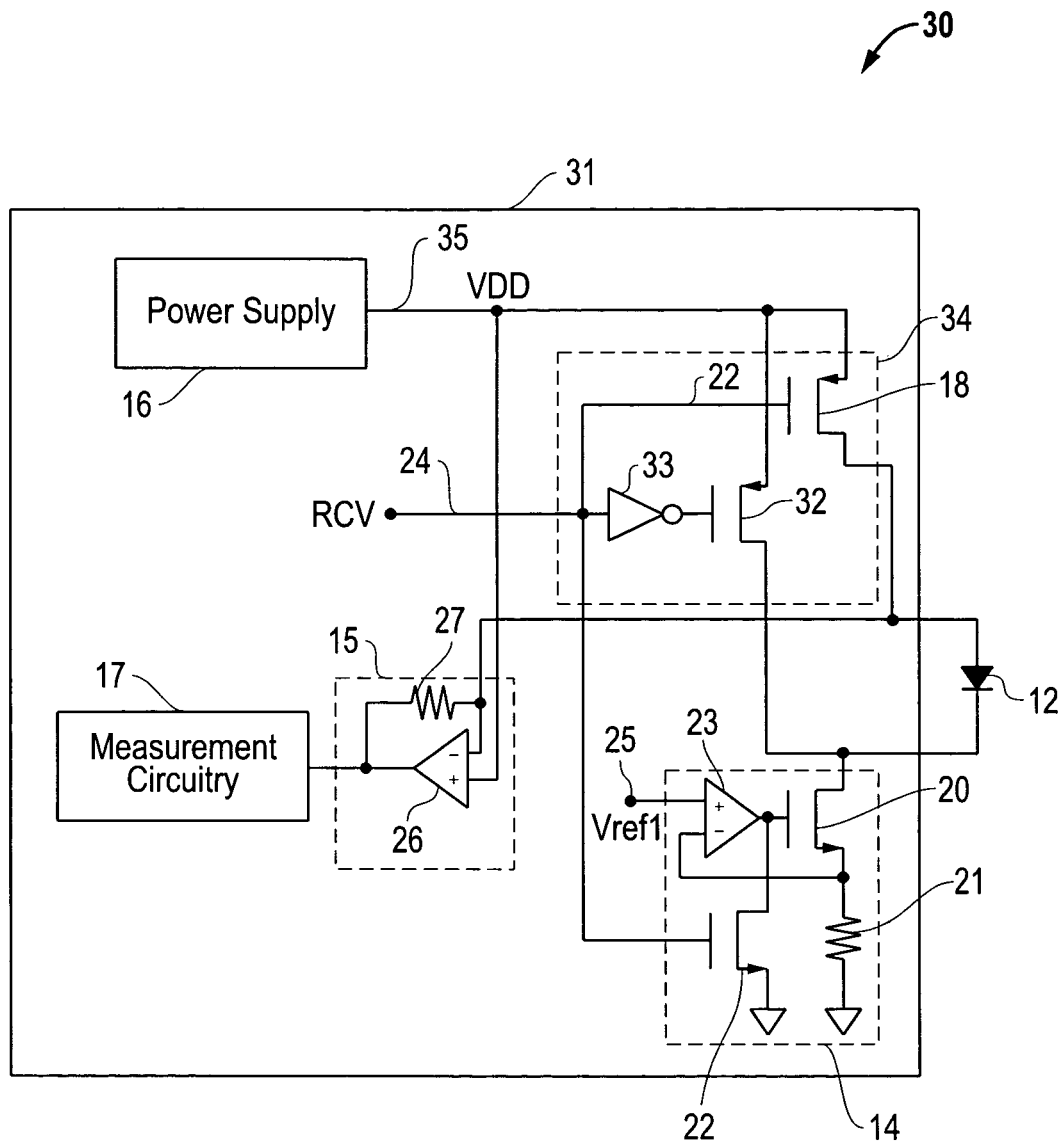
FIG. 2 is an alternative exemplary diagram for an apparatus that both produces light from one or more LEDs and applies a controlled voltage across the one or more LEDs in order to facilitate the measurement of a current induced in the one or more LEDs by incident light.
Figure 3:
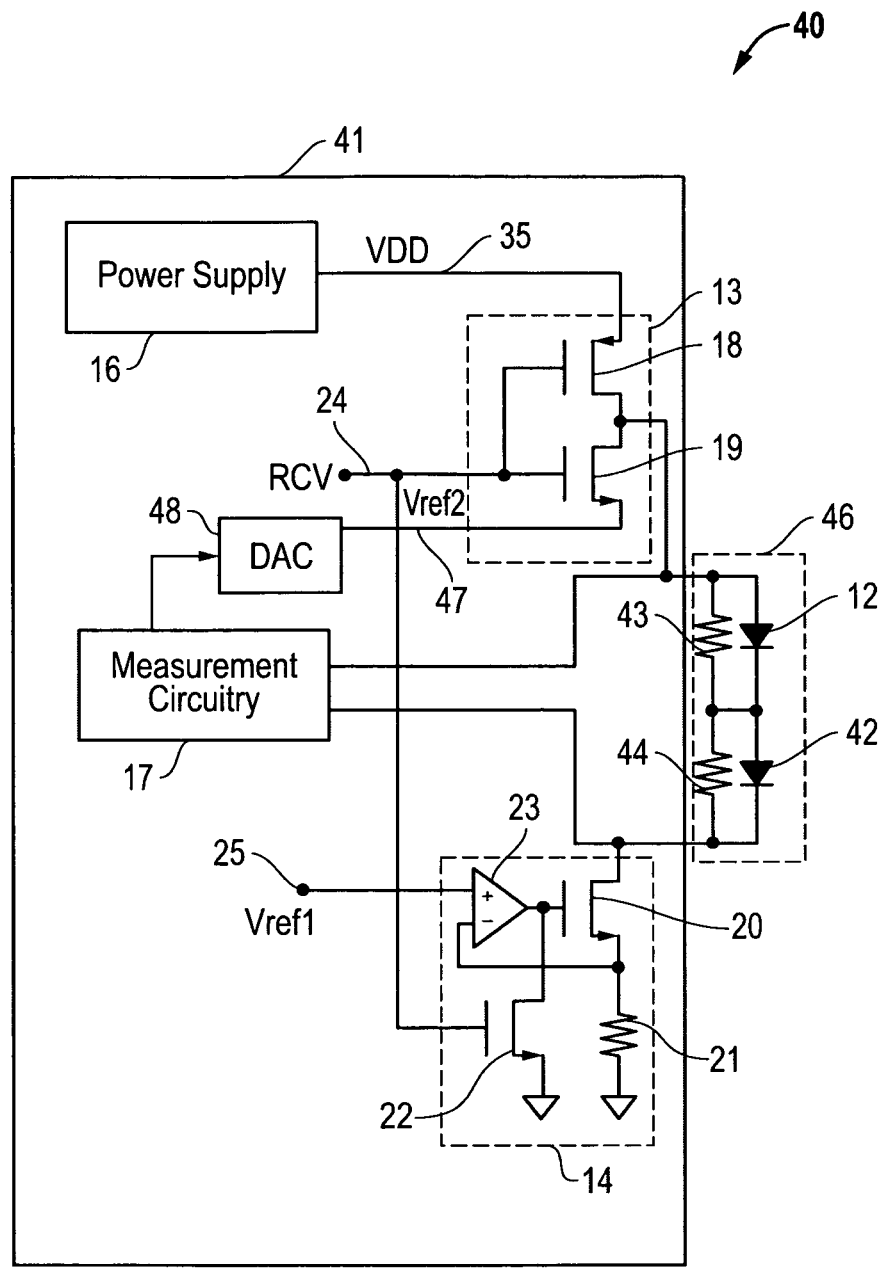
FIG. 3 is an exemplary diagram for an apparatus including a chain of LEDs with parallel connected resistors that can both produce light from the chain of LEDs and measure a voltage induced in the chain of LEDs by incident light.
Figure 4:
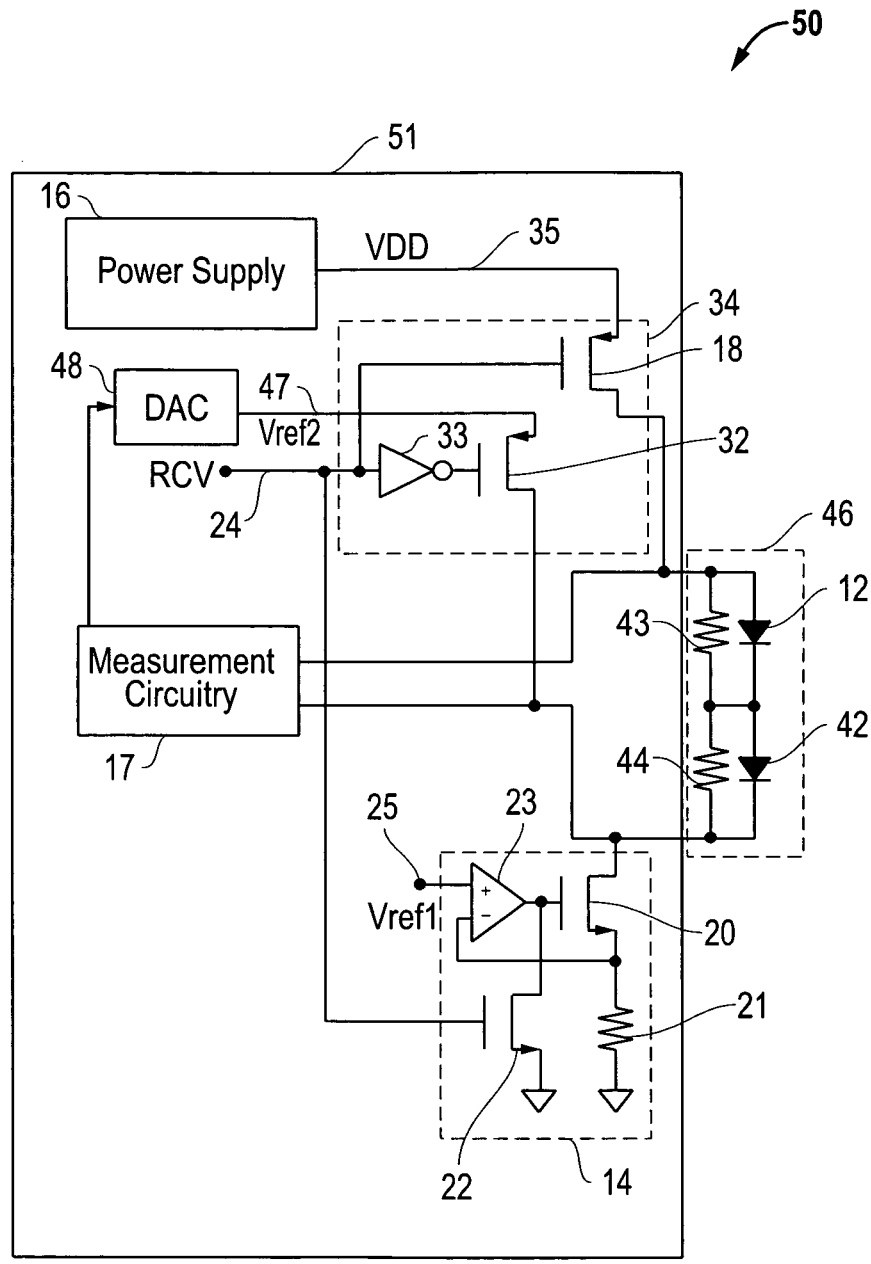
FIG. 4 is an alternative exemplary diagram for an apparatus including a chain of LEDs with parallel connected resistors that can both produce light from the chain of LEDs and measure a voltage induced in the chain of LEDs by incident light.

FIGS. 1 and 2 are directed to implementation variations for a first embodiment that can both produce light from one or more LEDs and detect light incident on such one or more LEDs while providing a controlled voltage across the one or more LEDs during the receive state of operation. FIGS. 3 and 4 are directed to implementation variations for a second embodiment that includes chains of LEDs with one or more parallel connected resistors that can both produce light from the LED chain during a transmit state and measure a voltage induced in such LED chain by incident light during a receive state while applying a reference voltage to the LED chain during the receive state of operation. It is noted that the disclosed embodiments and variations are configured to utilize control circuitry to apply a controlled voltage across an LED or LEDs, as shown in FIGS. 1 and 2, or to utilize control circuitry to apply a reference voltage to an LED chain or an LED, as shown in FIGS. 3 and 4. During the receive state of operation, the controlled voltages or reference voltages applied by this control circuitry facilitate measurements associated with currents induced in the LED or LEDs by incident light received by the LED or LEDs.

It is noted that the use of one or more LEDs as optical transceivers to transmit light during a transmit state and to receive light during a receive state, as described herein, can be useful in many different applications. For instance, lamps typically used for general illumination can communicate with each other and with a remote controller using visible light as described, for example, in U.S. Patent application Ser. No. 12/803,805 and U.S. patent application Ser. No. 12/806,126, which are identified above. The LEDs in the lamps can provide illumination, transmit data optically, receive data optically, measure ambient light, and measure the light produced by each other to produce and maintain a desired color. Additionally, color produced by groups of multi-colored LEDs can be set and maintained by using the LEDs themselves to measure the light produced by each other and to balance the brightness of each accordingly, as described, for example, with respect to the methods and systems disclosed in U.S. patent application Ser. Nos. 12,806,117; 12,806,121; 12,806,118 and 12,806,113; which are identified above. Such methods and systems are also useful for a wide range of applications including lamps, LCD backlights, projectors, digital billboards, and active matrix direct emission organic LED displays. Additional applications that benefit from using LEDs both as light emitters and light detectors are also described in U.S. patent application Ser. Nos. 12/360,467; 12/584,143 and 12/806,114; which are identified above. As stated above, each of the applications referenced in this paragraph is incorporated by reference in its entirety.

Turning now to the drawings, FIG. 1 is an example diagram for circuitry 11 in an apparatus 10 that both forces current through an LED 12 to emit light during a transmit state and applies a controlled voltage across LED 12 during a receive state to facilitate measurement of the current induced in LED 12 by incident light. The example circuitry 11 includes power supply 16, switch circuitry 13, current source circuitry 14, trans-impedance amplifier 15, and measurement circuitry 17. When the apparatus 10 is operating in a transmit state, the receive signal (RCV) 24 is low, and when the apparatus 10 is operating in a receive state, RCV 24 is high, although it is noted that different logic levels for the RCV 24 control signal could also be implemented if desired (e.g., high for receive, low for transmit). In the transmit state, a substantially fixed current determined by current source 14 flows through LED 12, which consequently emits light. In the receive state, current source 14 is disabled; the anode of LED 12 is shorted to ground; the current induced in LED 12 by incident light is converted to a voltage by trans-impedance amplifier 15; and this voltage is measured by measurement circuitry 17. Feedback resistor 27 in trans-impedance amplifier 15 forces the input terminals of operational amplifier (op-amp) 26 to the same voltage. In the receive state, the op-amp 26 and feedback resistor 27 operate to force the cathode of LED 12 to substantially ground, and consequently a controlled voltage is applied across LED 12 that is substantially zero volts. This controlled voltage is substantially zero volts because the anode of LED 12 is coupled to ground through transistor 19 in the receive state of operation, and at the same time the cathode of LED 12 is held to substantially ground by the trans-impedance amplifier 15.

In the transmit state, for the embodiment depicted, P-type MOS (PMOS) transistor 18 is conductive and N-type MOS (NMOS) transistor 19 is non-conductive. And in the receive state, PMOS transistor 18 is non-conductive and NMOS transistor 19 is conductive. As such, the anode of LED 12 is connected to power supply 16 in the transmit state and to ground in the receive state. Likewise, in the transmit state, N-type MOS transistor 22 in current source 14 is non-conductive, which allows op-amp 23 in combination with N-type MOS transistor 20 and resistor 21 to maintain a fixed current flow through transistor 20 and resistor, 21 by forcing the voltage across resistor 21 to be equal to a first reference voltage (Vref1) 25. In the receive state, NMOS transistor 22 is conductive, which forces the gate of NMOS transistor 20 low making NMOS transistor 20 non-conductive. Thus, current source 14 is disabled in the receive state of operation. As such, current source 14 produces a substantially fixed current in the transmit state and a very high impedance load in the receive state. It is further noted that current through resistor 21 and through LED 12 during the transmit state can be adjusted, as desired, by adjusting the first reference voltage (Vref1) 25.

In the receive state, although transistor 18 is non-conductive, noise and ripple from power supply 16 could pass through transistor 18 in such non-conductive state to the anode LED 12 due to parasitic capacitances and leakage currents, which could disturb the measurements of light induced currents in LED 12. However, because transistor 19 shorts the drain of transistor 18 to ground, as well as the anode of LED 12, such potentially adverse effects of parasitic capacitances and leakage currents due to transistor 18 are reduced in some implementations where those effects may exist. Likewise, because the cathode of LED 12 and consequently the drain of transistor 20 are forced to substantially ground by trans-impedance amplifier 15, transistor 20 leakage currents are reduced because there is no voltage drop across any terminals of transistor 20. Thus, substantially all the current induced in LED 12 by incident light flows from the output of op-amp 26 through resistor 27, through LED 12, and through transistor 19 to ground. This current flow produces a positive voltage relative to ground on the output of op-amp 26 that is proportional to the current induced in LED 12. This positive voltage can then be measured to determine the light induced on LED 12.

It is also noted that measurement circuitry 17 could implement a wide variety of functions depending on the application desired for apparatus 10. For instance, if apparatus 10 is being used to receive modulated light for data communication applications, measurement circuitry 17 could include any one of many different types of well known clock and data recovery circuits. If apparatus 10 is being used to measure ambient light or light from other LEDs to balance color for instance, measurement circuitry 17 could include an analog to digital (A/D) converter to digitize the voltages and optionally amplifier or pre-amplifier circuitry providing a voltage gain in front of the A/D converter. The measurement circuitry could also be a simple comparator, if desired, used to detect whether the light induced current is above or below a threshold. The measurement circuitry 17, therefore, can be configured and implemented as desired depending upon the application.

It is further noted that power supply 16 could include any type of circuitry, as desired, that is configured to supply the current to LED 12 and current source 14. Common power supplies include AC-to-DC or DC-to-DC converters operating as, switch mode power supplies or linear power supplies. Likewise, such switch mode supplies could be inductor-based or capacitor-based charge pumps and could have a wide variety of topologies such Boost, Buck, Flyback, Cepic, etc. Further, it is noted that transistor 18 could be a device separate from power supply 16 or it could be part of power supply 16, provided power supply 16 is configured to produce a high impedance output that transistor 19 could short to ground. One example for the power supply circuitry 16 could be a low drop out (LDO) regulator with an enable signal. Power supply 16 could also implement a current feedback loop, if desired, in which power supply 16 output flows through a resistor with the resulting voltage across such resistor connected to power supply 16 to provide feedback. For example, current source 14 could be a resistor and a serially connected switch which produces a very high impedance load on the cathode of LED 12 in the receive state and a relatively low impedance load in the transmit state. A voltage across this resistor could be used for the current feedback loop for the power supply 16. A typical value for this resistor, such as resistor 21, whether used as part of a power supply control loop or not could be in the 1 to 10 ohm range, which would produce 100 mV drop for current values in the 10-100 mA range.

If desired, current source 14 could be implemented to include circuitry different from that shown in FIG. 1 or described in the preceding paragraph. For instance, current source 14 could include transistor 20 and an additional N-type MOS transistor configured as a current mirror. Current source 14 in the embodiment of FIG. 1 sinks LED 12 current in the transmit state and draws substantially no current from LED 12 in the receive state. Thus, in one simple case, current source 14 could just be a switch, provided power supply 16 is configured to produce the proper current for LED 12.

Although parasitic leakage current in transistor 20 may increase, in some cases it may be desirable to apply a bias voltage, for instance a reverse bias voltage, across LED 12 in the receive state. Such bias voltage across LED 12 can be generated in many ways. One example is to connect the positive input terminal 29 of op-amp 26 to a reference voltage instead of to ground as shown in FIG. 1. Because feedback resistor 27 operates to force both inputs of op-amp 26 to the same voltage, the cathode of LED 12 will be forced to such reference voltage in the receive state. Provided the source terminal 28 of transistor 19 and consequently the anode of LED 12 are connected to ground in the receive state, LED 12 will be reverse biased by an amount equal to such reference voltage in the receive state. Further, the source terminal 28 of transistor could be connected to a different reference voltage instead of to ground as shown in FIG. 1. If the source terminal 28 of transistor 19 is connected to a different reference voltage other than ground, the bias voltage across LED 12 in the receive state will be equal to the difference in voltages between the reference voltage connected to the source terminal 28 of transistor 19 and the reference voltage coupled to the positive input terminal 29 of op-amp 26. As such, for these example implementations, if a bias voltage is desired across LED 12, then the voltage connected to the positive input terminal 29 of op-amp 26 or the voltage connected to the source terminal 28 of transistor 19 or both of these voltages can be adjusted to the same or different reference voltages, as desired, to generate a desired controlled voltage across the LED 12, such as a substantially zero voltage or a desired bias voltage.

As described above, therefore, during operation in the receive state, the example embodiment illustrated in FIG. 1 connects the anode of LED 12 to a fixed voltage, such as ground, and uses a trans-impedance amplifier, or other circuitry if desired, to hold the cathode of LED 12 to the same or different substantially fixed voltage, such as ground to generate a substantially zero voltage across LED 12 or some other reference voltage to generate a bias voltage across LED 12. It is noted, however, that the cathode voltage will likely vary very slightly due to the finite gain of op-amp 26.

FIG. 1 illustrates one example of many different possible embodiments for apparatus 10, and many implementation variations of circuitry 11 have also been described above, and other variations could be implemented if desired. Additionally, LED 12 could include just a single LED or could be many LEDs connected in series or in parallel or a combination of both. As such, FIG. 1 is just one example of an apparatus that can both produce light from one or more LEDs and detect light incident on such one or more LEDs while providing a controlled voltage across the one or more LEDs during the receive state of operation.

FIG. 2 is an example diagram for alternative circuitry 31 in an alternative apparatus 30 that both forces current through an LED 12 to emit light during a transmit state and applies a controlled voltage across LED 12 in a receive state to facilitate measurement of currents induced in LED 12 by incident light. The example circuitry 31 can include the same power supply circuitry 16, current source circuitry 14, trans-impedance amplifier 15, and measurement circuitry 17 as in circuitry 11 of FIG. 1. However, switch circuitry 34 replaces switch circuitry 13. In the transmit state, circuitry 31 can be configured to operate the same as example circuitry 11 in FIG. 1. However, in the receive state, instead of the cathode and anode of LED 12 being referenced to ground, the cathode and anode of LED 12 are instead referenced to the supply voltage (VDD) 35. For the embodiment depicted, RCV 24 is applied to the gates of transistors 18 and 22 and is applied to the gate of transistor 32 through inverter 33. Thus, in the receive state, P-type MOS transistor 32 is in a conductive state and connects the cathode of LED 12 to VDD 35, and P-type MOS transistor 18 is set to a non-conductive state. Further, in the receive state, the trans-impedance amplifier 15 forces the anode of LED 12 to VDD 35 because the positive input terminal of op-amp 26 is connected to VDD 35 instead of to ground as in FIG. 1. In the receive state, the drain of N-type transistor 20 in current source 14 is also shorted to VDD 35 along with the anode of LED 12. In the transmit state, PMOS transistor 18 is conductive and PMOS transistor 32 is non-conductive.

In operation in the receive state, having the anode and cathode of LED 12 connected to the common voltage reference of VDD 35 helps to reduce potentially adverse effects of noise and ripple from power supply 16 and of leakage currents associated with transistor 20 on light induced current measurements associated with LED 12. Likewise, the effects of transistor 18 leakage currents are reduced because there is no voltage drop across any terminals of transistor 18. The light induced current in LED 12 flows from VDD 35, through transistor 32, through LED 12, through resistor 27, and into the output of op-amp 26. The resulting op-amp 26 output voltage relative to the voltage of VDD 35 is proportional to the light induced current in LED 12.

It is again noted, as in example circuitry 11, that measurement circuitry 17, power supply circuitry 16, and current source circuitry 14 in example circuitry 31 could have many different possible implementations. Likewise as described with respect to FIG. 1, in the receive state, the cathode and anode of LED 12 could be connected or forced to the same or different reference voltages instead of both being connected or held to VDD 35, for example, if a bias voltage is desired across LED 12. Additionally, LED 12 could be replaced by one or more LEDs connected in series or parallel, or a combination of both. As such FIG. 2 illustrates one example for an apparatus that can both produce light from one or more LEDs and detect light incident on such one or more LEDs while providing a controlled voltage across the one or more LEDs during the receive state of operation.

FIGS. 3 and 4 are now discussed which are advantageous for LED chains, as described above. Both FIGS. 3 and 4 provide example implementations that include a chain of LEDs with one or more parallel connected resistors that can both produce light from the chain of LEDs and measure a voltage induced in the chain of LEDs by incident light.

FIG. 3 is an example diagram for an apparatus 40 including circuitry 41 connected to LED chain 46 that includes serially connected LEDs along with resistors connected across these LEDs in parallel. In particular, for the embodiment depicted, LED chain 46 includes LEDs 12 and 42 with resistors 43 and 44 connected in parallel respectively, although other variations and numbers of LEDs and resistors could be utilized, as desired. As depicted, the circuitry 41 forces a first current through LED chain 46 to produce light when apparatus 40 is configured in a transmit state, and the circuitry 41 measures a voltage induced across LED chain 46 by incident light when the apparatus is configured in a receive state. As depicted, the example circuitry 41 includes power supply circuitry 16, switch circuitry 13, current source circuitry 14, and measurement circuitry 17. When the apparatus 40 is operating in a transmit state, RCV 24 is low, and when the apparatus 40 is operating in a receive state, RCV 24 is high. In the transmit state, a substantially fixed current determined by current source 14 flows through LED chain 46, which consequently emits light. In the receive state, however, current source 14 is disabled, and the anode of LED 12 is shorted to a second reference voltage (Vref2) 47, which can be provided by the output of a digital-to-analog converter (DAC) 48, if desired. The voltage induced across LED chain 46 by incident light can then be measured by measurement circuitry 17.

Provided the resistances of resistors 43 and 44 are not too high, in the receive state substantially all the current induced in LEDs 12 and 42 will flow through resistors 43 and 44 respectively. The resulting voltages across the anode to cathode terminals of the LED chain 46 will be positive, and the voltage applied to measurement circuitry 17 will be the sum of the voltages across the anode to cathode terminals of both LEDs 12 and 42. Like any diode, as the forward voltage across LEDs 12 and 42 increases, the forward current through such LEDs, which flows in the opposite direction to the light induced current, increases. To prevent this forward current from becoming significant relative to the light induced current, forward voltages for LEDs 12 and 42 can be limited to a few hundred millivolts. For a typical light induced current of about 1 uA, for example, the resistance of resistors 43 and 44 can be selected to be a few hundred thousand ohms.

Voltage reference (Vref2) 47 can be relative to ground in this example circuitry 41, and Vref2 47 can be selected to be large enough to help ensure that the cathode of LED 42 is above ground but small enough such that leakage current through transistor 20 is not significant. For example, Vref2 47 could be set to within 1 volt or less from ground. As a further example, Vref2 47 could be a fixed voltage, such as 500 mV for instance. Still further, Vref2 47 could be adjusted depending on the magnitude of the voltage across LED chain 46 induced by incident light. With little incident light, Vref2 47 could be lowered to reduced leakage current through transistor 20, and with significant incident light, Vref2 47 could be raised to prevent the cathode of LED 42 from dropping below ground. If desired, a feedback circuit or control loop, including DAC 48 and measurement circuitry 17, can be used to adjust Vref2 47 such that the cathode of LED 42 can be automatically set to a selected or optimum value depending upon the voltage measured across the LED chain 46. It is noted that if a fixed voltage is selected for Vref2, the DAC 48 can be removed, and Vref2 47 can be connected to a fixed voltage reference source.

In operation, possible adverse effects of noise and ripple from power supply 16 in some implementations on measurements of the voltage induced across LED chain 46 by incident light are reduced by connecting the anode of LED 12 through transistor 19 to Vref2 47, which is preferentially referenced to ground. Provided the source impedance of Vref2 47 in combination with the series impedance of transistor 19 is very low in comparison to the parasitic impedance through transistor 18 to VDD 35, such measurements will not be significantly affected by variations in VDD 35.

It is again noted that power supply circuitry 16, measurement circuitry 17, current source circuitry 14, and switch circuitry 13 could be implemented in many different ways. Likewise, LED chain 46 could be implemented in different ways and could have more or fewer series connected LEDs or could have some combination of series and parallel connected LEDs. Additionally, not all series connected LEDs need to have a resistor connected in parallel. For example, only one LED could have a resistor connected in parallel, and such resistor could also be connected in parallel to a series combination of LEDs. Other variations of chains of LEDs and one or more parallel connected resistors across one or more of these LEDs could also be implemented, as desired. As such, FIG. 3 illustrates just one example apparatus including LEDs with parallel connected resistors that can both produce light from the LED chain during a transmit state and measure a voltage induced in such LED chain by incident light during a receive state while applying a reference voltage to the LED chain during the receive state of operation.

FIG. 4 is an example diagram for alternative circuitry 51 in an alternative apparatus 50 connected to LED chain 46 including LEDs 12 and 42 with resistors 43 and 44 connected in parallel respectively. The circuitry 51 forces a current through LED chain 46 to produce light when apparatus 50 is configured in a transmit state, and circuitry 51 measures a voltage induced across LED chain 46 by incident light when the apparatus is configured in a receive state. If desired, the example circuitry 51 can include the same power supply circuitry 16, measurement circuitry 17, and current source circuitry 14 as described for FIGS. 1-3 and the switch circuitry 34 described for FIG. 2. Apparatus 50 operates the same as apparatus 40 except in the receive state, transistor 32 connects the cathode of LED 42 to the second reference voltage (Vref2) 47, which is preferably referenced to VDD 35. Using Vref2 47, the anode of LED 12 is preferably held close to but just below the voltage of VDD 35. For example, Vref2 47 could be set to within 1 volt or less from the power supply voltage (VDD) 35. As a further example, Vref2 47 could be set to be 500 mV below the voltage of VDD 35.

In this example apparatus 50, the possible adverse effects of power supply 16 ripple and noise and transistor 20 leakage currents in some implementations are reduced because the drain of transistor 20 is shorted to Vref2 47, which is referenced to VDD 35. Provided the output impedance of DAC 48, which produces Vref2 47, in combination with the series impedance of transistor 32 are very low in comparison to the parasitic impedance of transistor 20 to ground, power supply 16 ripple and noise should not adversely affect measurements of the voltage induced across LED chain 46 by incident light. The magnitude of the voltage on Vref2 47 relative to VDD 35 can be configured to be slightly larger than the voltage between the anode of LED 12 and the cathode of LED 42 induced by incident light, and can be on the order of a few hundred millivolts. Similar to the embodiment of FIG. 3, a feedback circuit or control loop, including measurement circuitry 17 and DAC 48, can also be used to monitor the voltage of the anode of LED 12 and to adjust Vref2 47 to continually or periodically reduce or minimize the voltage difference between the anode of LED 12 and VDD 35. As such, leakage current through transistor 18 is reduced, because the voltage between any terminals of transistor 18 is reduced. It is again noted that if a fixed voltage is selected for Vref2, the DAC 48 can be removed, and Vref2 47 can be connected to a fixed voltage reference source.

It is again noted that power supply circuitry 16, measurement circuitry 17, current source circuitry 14, and switch circuitry 34 could be implemented in many different ways. As such, FIG. 4 illustrates just one possible implementation. Likewise, LED chain 46 could have more or fewer series connected LEDs or could have some combination of series and parallel connected LEDs. Additionally, not all series connected LEDs need to have a resistor connected in parallel. For example, only one LED could have a resistor connected in parallel, and such resistor could also be connected in parallel to a series combination of LEDs. Other variations of chains of LEDs and one or more parallel connected resistors across one or more of these LEDs could also be implemented, as desired. As such, FIG. 4 illustrates just one example apparatus including LEDs with parallel connected resistors that can both produce light from such LED chain and measure a voltage induced in such LED chain by incident light while applying a reference voltage to the LED chain during the receive state of operation.

Numerous variations and modifications will become apparent to those skilled in the art once the above disclosure is fully appreciated.

What is claimed is:

1. An apparatus for transmitting and receiving light, comprising:
    current source circuitry coupled to an LED and configured to force a first current through the LED to produce light during a transmit state;
    control circuitry coupled to the LED and configured to apply a controlled voltage across the LED during a receive state, wherein the control circuitry comprises switch circuitry configured to couple an anode of the LED to a power supply voltage in the transmit state and to couple the anode of the LED to near ground in the receive state; and
    measurement circuitry coupled to the LED and configured to measure a second current induced in the LED by incident light during the receive state.

2. The apparatus as recited in claim 1, wherein the LED comprises a chain of LEDs.

3. The apparatus as recited in claim 1, wherein the controlled voltage applied across the LED is substantially zero volts.

4. The apparatus as recited in claim 1, wherein the controlled voltage applied across the LED is configured to reverse bias the LED.

5. The apparatus as recited in claim 1, wherein the control circuitry comprises a trans-impedance amplifier coupled to a cathode of the LED.

6. An apparatus for transmitting and receiving light, comprising
    an LED chain, the LED chain comprising one or more serially connected LEDs with at least one LED in the LED chain coupled in parallel with a resistor;
    current source circuitry coupled to the LED chain and configured to force a first current through the LED chain to produce light during a transmit state;
    control circuitry coupled to the LED chain and configured to apply a reference voltage to the LED chain during a receive state; and
    measurement circuitry coupled to the LED chain and configured to measure a voltage induced in the LED chain by incident light during the receive state; and
    wherein the control circuit is further configured to vary the reference voltage based upon a measurement of the voltage induced in the LED chain by incident light during the receive state.

7. The apparatus of claim 6, wherein each LED in the LED chain is coupled in parallel with a resistor.

8. The apparatus as recited in claim 6, wherein an anode of one of the LEDs in the LED chain and a cathode of one of the LEDs in the LED chain are coupled to amplifier circuitry configured to amplify a voltage between the anode and the cathode.

9. The apparatus as recited in claim 6, wherein an anode of one of the LEDs in the LED chain and a cathode of one of the LEDs in the LED chain are coupled to analog to digital converter circuitry configured to digitize the voltage between the anode and the cathode.

10. The apparatus as recited in claim 6, wherein the control circuitry comprises switch circuitry configured to couple an anode of one of the LEDs in the LED chain to a power supply voltage in the transmit state and to the reference voltage in the receive state.

11. The apparatus as recited in claim 10, wherein the reference voltage is within 1 volt from ground.

12. The apparatus as recited in claim 6, wherein the control circuitry comprises switch circuitry configured to couple a cathode of one of the LEDs in the LED chain to the reference voltage in the receive state and not to couple the cathode to the reference voltage in the transmit state.

13. The apparatus as recited in claim 12, wherein an anode of one of the LEDs in the LED chain is coupled to a power supply voltage in the transmit state, and wherein the reference voltage is within 1 volt from the power supply voltage.

14. A method for transmitting and receiving light, comprising:
    forcing a first current through an LED to produce light during a transmit state by coupling an anode of the LED to a power supply voltage in the transmit state;
    applying a controlled voltage across the LED during a receive state by coupling the anode of the LED to ground in the receive state; and
    measuring a second current induced in the LED by incident light during the receive state.

15. The method as recited in claim 14, wherein the LED comprises a chain of LEDs.

16. The method as recited in claim 14, wherein the applying step comprises applying a controlled voltage of substantially zero volts across the LED.

17. The method as recited in claim 14, wherein the applying step comprises reverse biasing the LED with the controlled voltage.

18. The method as recited in claim 14, wherein the applying step utilizes a trans-impedance amplifier coupled to a cathode of the LED.

19. A method for transmitting and receiving light, comprising
    forcing a first current through an LED chain to produce light during a transmit state, the LED chain comprising one or more LEDs with at least one LED in the LED chain coupled in parallel with a resistor;
    applying a reference voltage to the LED chain during a receive state;
    measuring a voltage induced in the LED chain by incident light during the receive state; and
    varying the reference voltage based upon the measuring step.

20. The method as recited in claim 19, wherein each LED in the LED chain is coupled in parallel with a resistor.

21. The method as recited in claim 19, further comprising amplifying a voltage between an anode of one of the LEDs in the LED chain and a cathode of one of the LEDs in the LED chain.

22. The method as recited in claim 19, further comprising digitizing a voltage between an anode of one of the LEDs in the LED chain and a cathode of one of the LEDs in the LED chain.

23. The method as recited in claim 19, wherein the applying step comprises coupling an anode of one of the LEDs in the LED chain to a power supply voltage in the transmit state and to the reference voltage in the receive state.

24. The method as recited in claim 23, wherein the reference voltage is within 1 volt from ground.

25. The method as recited in claim 19, wherein the applying step comprises coupling a cathode of one of the LEDs in the LED chain to the reference voltage in the receive state and not coupling the cathode to the voltage reference in the transmit state.

26. The method as recited in claim 25, further comprising coupling an anode of one of the LEDs in the LED chain to a supply voltage in the transmit state, and wherein the reference voltage is within 1 volt from the power supply voltage.

27. An apparatus for transmitting and receiving light, comprising:
    current source circuitry coupled to an LED and configured to force a first current through the LED to produce light during a transmit state;
    control circuitry coupled to the LED and configured to apply a controlled voltage across the LED during a receive state, wherein the control circuitry comprises switch circuitry configured to couple an anode of the LED to a power supply voltage in the transmit state and not to couple the anode of the LED to the power supply voltage in the receive state; and
    measurement circuitry coupled to the LED and configured to measure a second current induced in the LED by incident light during the receive state.

28. The apparatus as recited in claim 27, wherein the control circuitry comprises a trans-impedance amplifier, which is coupled to the anode of the LED in the receive state.

29. The apparatus as recited in claim 28, wherein the switch circuitry is further configured to couple a cathode of the LED to the power supply voltage in the receive state.

30. The apparatus as recited in claim 27, wherein the control circuitry comprises a trans-impedance amplifier, which is coupled to the cathode of the LED in the receive state.

31. The apparatus as recited in claim 30, wherein the switch circuitry is further configured to couple the anode of the LED to a reference voltage in the receive state.

32. A method for transmitting and receiving light, comprising:
    forcing a first current through an LED to produce light during a transmit state by coupling an anode of the LED to a power supply voltage in the transmit state;
    applying a controlled voltage across the LED during a receive state by not coupling the anode of the LED to the power supply voltage in the receive state; and
    measuring a second current induced in the LED by incident light during the receive state.

33. The method as recited in claim 32, wherein the applying step utilizes a trans-impedance amplifier coupled to an anode of the LED.

34. The method as recited in claim 32, further comprising coupling a cathode of the LED to the power supply voltage in the receive state.

* * * * *